US010591038B2

(12) United States Patent
Cronin

(10) Patent No.: US 10,591,038 B2
(45) Date of Patent: Mar. 17, 2020

(54) VARIATOR-ASSISTED TRANSMISSION

(71) Applicant: Caterpillar Inc., Peoria, IL (US)

(72) Inventor: Michael G. Cronin, Peoria, IL (US)

(73) Assignee: Perkins Engines Company Limited, Peterborough (GB)

( * ) Notice: Subject to any disclaimer, the term of this patent is extended or adjusted under 35 U.S.C. 154(b) by 406 days.

(21) Appl. No.: 15/316,793

(22) PCT Filed: Jun. 12, 2015

(86) PCT No.: PCT/US2015/035539
§ 371 (c)(1),
(2) Date: Dec. 6, 2016

(87) PCT Pub. No.: WO2015/191992
PCT Pub. Date: Dec. 17, 2015

(65) Prior Publication Data
US 2017/0248217 A1    Aug. 31, 2017

(30) Foreign Application Priority Data

Jun. 13, 2014 (EP) .................................... 14172319

(51) Int. Cl.
*F16H 47/04*    (2006.01)
*F16H 3/66*    (2006.01)
(Continued)

(52) U.S. Cl.
CPC ............... *F16H 47/04* (2013.01); *F16H 3/66* (2013.01); *F16H 48/10* (2013.01); *B60K 17/08* (2013.01);
(Continued)

(58) Field of Classification Search
CPC . B60K 17/08; B60K 17/16; F16H 2037/0886; F16H 2048/104;
(Continued)

(56) References Cited

U.S. PATENT DOCUMENTS 4,024,775 A    5/1977  Anderson et al.
4,291,592 A    9/1981  Meyerle et al.
(Continued)

FOREIGN PATENT DOCUMENTS

CA    2559498 A    3/2008
DE    3726119 A1    2/1989
(Continued)

OTHER PUBLICATIONS

Japanese Office Action related to Application No. 2016-569792, reported dated Feb. 26, 2019.
(Continued)

*Primary Examiner* — Jacob S. Scott
(74) *Attorney, Agent, or Firm* — Murgitroyd & Company

(57) ABSTRACT

A continuously variable transmission (CVT) is provided, where the CVT has an input shaft drivable by an engine, and an output shaft connectable to a load. A variator has an input side connected to the input shaft, and an output side. The variator is adjustable so as to vary a transmission ratio between the input and output sides. A differential transmission has a first differential input element connected to the input shaft, a second differential input element connected to the output side of the variator, and first and second differential output elements. A range transmission has a first range input element, and at least one range output element connected to the output shaft. A first connecting component selectively connects the first differential output element to the first range input element. A second connecting component selectively connects the second differential output element to the first range input element. The first and second connecting components are located in a connecting space defined between the differential and range transmissions. A vehicle incorporating this CVT, and a method of operating the CVT are also provided.

19 Claims, 11 Drawing Sheets

(51) Int. Cl.
*F16H 48/10* (2012.01)
*F16H 37/08* (2006.01)
*B60K 17/08* (2006.01)
*B60K 17/16* (2006.01)

(52) U.S. Cl.
CPC ...... *B60K 17/16* (2013.01); *F16H 2037/0886* (2013.01); *F16H 2048/104* (2013.01); *F16H 2048/106* (2013.01); *F16H 2200/2012* (2013.01)

(58) Field of Classification Search
CPC ....... F16H 2048/106; F16H 2200/2012; F16H 3/66; F16H 47/04; F16H 48/10
See application file for complete search history.

(56) References Cited

U.S. PATENT DOCUMENTS

| | | | |
|---|---|---|---|
| 4,304,151 | A | 12/1981 | Meyerle et al. |
| 4,591,016 | A | 5/1986 | Matthews |
| 4,994,002 | A | 2/1991 | Valetta et al. |
| 5,567,452 | A | 10/1996 | Rebhan |
| 5,695,422 | A | 12/1997 | Often |
| 6,033,332 | A | 3/2000 | Evans |
| 6,042,496 | A | 3/2000 | Lehle et al. |
| 6,424,902 | B1 | 7/2002 | Kuras |
| 8,708,081 | B1 | 4/2014 | Williams |
| 2008/0105475 | A1 | 5/2008 | Hu |
| 2008/0242468 | A1 | 10/2008 | Wafzig |
| 2010/0151980 | A1 | 6/2010 | Bowman et al. |
| 2010/0192576 | A1 | 8/2010 | Legner |
| 2010/0280712 | A1 | 11/2010 | Bowman |
| 2011/0015022 | A1 | 1/2011 | Stoeckl et al. |
| 2011/0256972 | A1 | 10/2011 | Greenwood |
| 2012/0196713 | A1 | 8/2012 | He et al. |
| 2012/0231914 | A1 | 9/2012 | Liebherr et al. |
| 2013/0023370 | A1 | 1/2013 | Grad et al. |
| 2014/0103761 | A1 | 4/2014 | Atkins et al. |

FOREIGN PATENT DOCUMENTS

| | | |
|---|---|---|
| DE | 4027724 A1 | 4/1991 |
| DE | 4106746 A1 | 9/1992 |
| DE | 102010062789 A1 | 6/2012 |
| FR | 2962180 B | 1/2013 |
| GB | 2136069 A | 9/1984 |
| GB | 2464257 A | 4/2010 |
| GB | 1512949 A | 1/2013 |
| WO | WO 8201519 A1 | 5/1982 |
| WO | WO-87/06316 A1 | 10/1987 |
| WO | WO-00/71377 A1 | 11/2000 |
| WO | WO 2007138353 A2 | 12/2007 |
| WO | WO 2011048102 A1 | 4/2011 |
| WO | WO 2013083885 A1 | 4/2011 |
| WO | WO-2012/171813 A1 | 12/2012 |
| WO | WO 2013174825 A1 | 11/2013 |
| WO | WO 2013175165 A1 | 11/2013 |
| WO | WO 2014076216 A1 | 11/2013 |
| WO | WO 2014102300 A1 | 7/2014 |

OTHER PUBLICATIONS

Search Report for related European Application No. EP14172319,7; report dated Mar. 15, 2017.
Search Report for related International Application No. PCT/US2015/035539; reported dated Oct. 26, 2015.

VARIATOR-ASSISTED TRANSMISSION

CROSS-REFERENCE TO RELATED APPLICATION

This Application is a 35 USC § 371 US National Stage filing of International Application No. PCT/US2015/035539 filed on Jun. 12, 2015, and claims priority under the Paris Convention to European Patent Application No. EP 14172319.7 filed on Jun. 13, 2014.

FIELD OF THE DISCLOSURE

Technical Field of the Invention

The present invention relates to transmissions for vehicles. More specifically, the present invention is a variator-assisted continuously variable transmission (CVT) suitable for use in heavy duty vehicles.

BACKGROUND OF THE DISCLOSURE

Variator-assisted CVTs are known and have been primarily devised in order to replace a conventional CVT in applications where a wide spread of gear ratios are desired. To do so with a conventional CVT would mean providing a CVT which is large and heavy, which is undesirable in a vehicle. Variator-assisted CVTs work by taking a force received at the transmission input shaft from an engine and splitting that force into two paths: one which is directed to the transmission output through a summing transmission alone, and the other which is directed through the variator and the summing transmission. Variator-assisted CVTs have primarily found use in off-highway vehicles which are used in so-called "cycling applications", where the vehicle is required to regularly move forwards and backwards. Examples of such vehicles are track-type tractors and wheel loaders.

A limitation of such transmissions is that they are comparatively large and heavy. Thus, whilst they would be useful in non-cycling applications such as for on-highway trucks and buses, they are difficult to package (i.e. scale down) for use in these other vehicles. Furthermore, they are typically more expensive and complicated than the transmissions which are already used in these on-highway applications.

It is an aim of the present invention to obviate or mitigate one or more of these disadvantages with existing variator-assisted CVTs.

SUMMARY OF THE DISCLOSURE

According to a first aspect of the invention, there is provided a continuously variable transmission comprising an input shaft drivable by an engine, and an output shaft connectable to a load. The transmission also comprises a variator having an input side connected to the input shaft, and an output side. The variator is adjustable so as to vary a transmission ratio between the input and output sides. A differential transmission has a first differential input element connected to the input shaft, a second differential input element connected to the output side of the variator, and first and second differential output elements. A range transmission has a first range input element, and at least one range output element connected to the output shaft.

A first connecting component selectively connects the first differential output element to the first range input element, and a second connecting component selectively connects the second differential output element to the first range input element. The first and second connecting components are located in a connecting space defined between the differential and range transmissions.

According to a second aspect of the invention there is provided a vehicle comprising a continuously variable transmission in accordance with the first aspect of the invention.

According to a third aspect of the invention there is provided a method of operating a continuously variable transmission in accordance with the first aspect of the invention. The method comprises the steps of operating one of the first and second connecting components so that the first or second differential output element connects to the first range input element, and adjusting the variator so as to vary a transmission ratio between the input and output sides of the variator.

BRIEF DESCRIPTION OF THE DRAWINGS

Preferred embodiments of the invention will now be described, by way of example only, with reference to the following drawings.

DETAILED DESCRIPTION OF THE DISCLOSURE

The accompanying figures illustrate a number of embodiments of a variator-assisted transmission (VAT). Many of these embodiments will be described as being modifications of one or more of the preceding embodiments. In such instances, components which are shared between the specific embodiments referred to will not be described again unless in relation to the modification being presented. It should therefore be assumed that the modified embodiments are arranged and operate in the same manner as the one or more embodiments upon which they are based unless stated otherwise.

Figure 1:
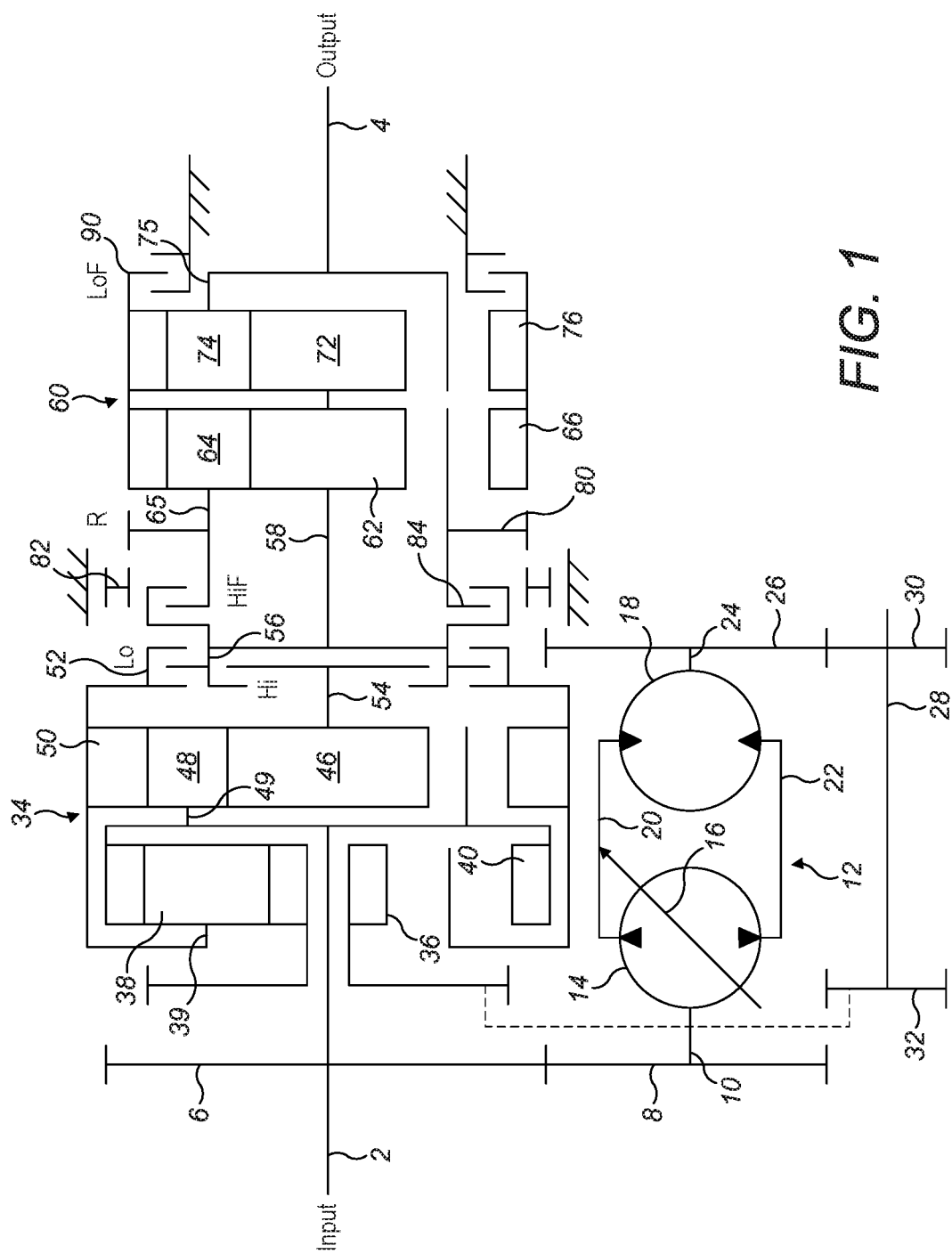
FIG. 1 is a schematic view of a first embodiment of a variator-assisted transmission.

FIG. 1 illustrates schematically a first embodiment of a VAT. The transmission comprises a transmission input shaft 2 which in operation will be connected to the engine of a vehicle (not shown), and a transmission output shaft 4 which will be connected to a load (not shown) such as the wheels of the vehicle. The input shaft 2 carries an input gear 6 which is meshed with a first satellite gear 8 which is carried on a variator input shaft 10 which lies in parallel to the input shaft 2. The input shaft 10 drives a variator, generally designated 12, which in this example is a hydrostatic variator. The variator 12 comprises a variable-volume pump 14 which is driven by the input shaft 10. The pump 14 has a control element or swash plate 16 of a known type, and is connected to a hydraulic motor 18 by a pair of hydraulic lines 20,22. The motor 18 is connected to a variator output shaft 24 which carries a variator output gear 26. A layshaft 28 lies parallel to the variator shafts 10,24 and has a first layshaft gear 30 which meshes with the output gear 26, and a second layshaft gear 32 which meshes with a first sun gear 36 of a summing transmission 34.

The summing, or differential, transmission, 34 comprises first and second planet gears 38,48 which are rotatably supported on first and second planet carriers 39,49. The first planet gear 38 meshes with the first sun gear 36 and a first ring gear 40. The second planet gear 48 meshes with a second sun gear 46 and a second ring gear 50. The first ring gear 40 and the second planet carrier 49 are connected to the input shaft 2 such that rotation of the input shaft 2 rotates these two elements as well. The first planet carrier 39 and the second ring gear 50 are connected to an input side of a first connecting component in the form of a first low speed clutch 52. The second sun gear 46 is non-rotatably connected to a first intermediate shaft 54, which is co-axial with the input and output shafts 2,4. The first intermediate shaft 54 is connected to an input side of a second connecting component in the form of a first high speed clutch 56.

The first low and high speed clutches 52,56 selectively connect the summing transmission 34 with an output, or range, transmission 60 such that the transmissions 34,60 are co-axial with one another. Both the clutches 52,56 are located in a connecting space defined between the summing and output transmissions 34,60. As stated above, the input side of each of the low and high speed clutches 52,56 is connected to at least one element of the summing transmission 34. An output side of each of the first low and high speed clutches 52,56 is connected to a second intermediate shaft 58, which is co-axial with the transmission input and output shafts 2,4 and the first intermediate shaft 54. The output transmission 60 comprises third and fourth sun gears 62,72 which are both connected to the second intermediate shaft 58. The third sun gear 62 meshes with a third planet gear 64 which is rotatably supported upon a third planet carrier 65, and the third planet gear 64 meshes with a third ring gear 66. The fourth sun gear 72 meshes with a fourth planet gear 74 which is rotatably supported upon a fourth planet carrier 75, and the fourth planet gear 74 meshes with a fourth ring gear 76. The third planet carrier 65 is connected to a reverse member 80, which in order to provide a reverse rotation at the output shaft 4 may be selectively held against rotation by a sliding collar 82.

As well as being selectively connected to the second intermediate shaft 58, the first low and high speed clutches 52,56 are also selectively connected to the input side of a third connecting component in the form of a second high speed clutch 84. The second high speed clutch 84 is located in the connecting space with the first low and high speed clutches 52,56 and has an output side connected to the third planet carrier 65. Thus, when the second high speed clutch 84 is engaged the third sun and planet gears 62,64 are locked together and will rotate as one.

The third and fourth ring gears 66,76 are connected to one another and a second low speed clutch, or braking element, 90. When the second low speed clutch 90 is engaged the third and fourth ring gears 66,76 are prevented from rotating. The fourth planet carrier 75 is connected to the output shaft 4.

Figure 2:
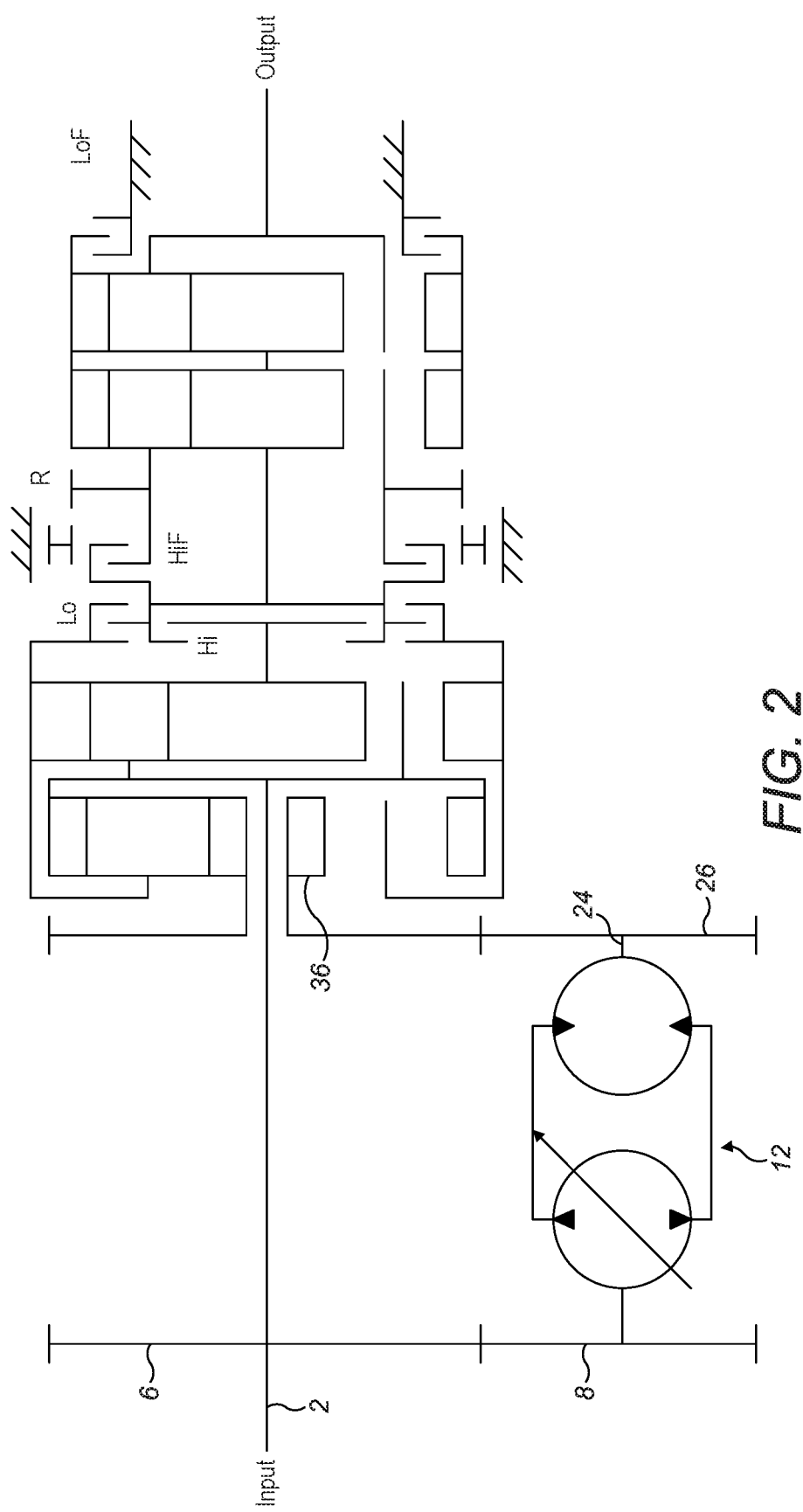
FIG. 2 is a schematic view of a second embodiment of a variator-assisted transmission.

FIG. 2 schematically illustrates a second embodiment of a VAT, which is a modification of that shown in FIG. 1. In the first embodiment, the variator is intended to be packaged in a vehicle below the summing and output transmissions. In this second embodiment, the position of the variator is moved so that is in line with the summing and output transmissions. This modification involves moving the input and satellite gears 6,8 along the input shaft 2 so that they are closer to the engine (not shown). This frees up space and allows the variator 12 to be moved up into the vacated space in line with the remainder of the transmission. Consequently, the layshaft can be removed with the variator output shaft 24 directly connected to the first sun gear 36 via the variator output gear 26.

Figure 3:
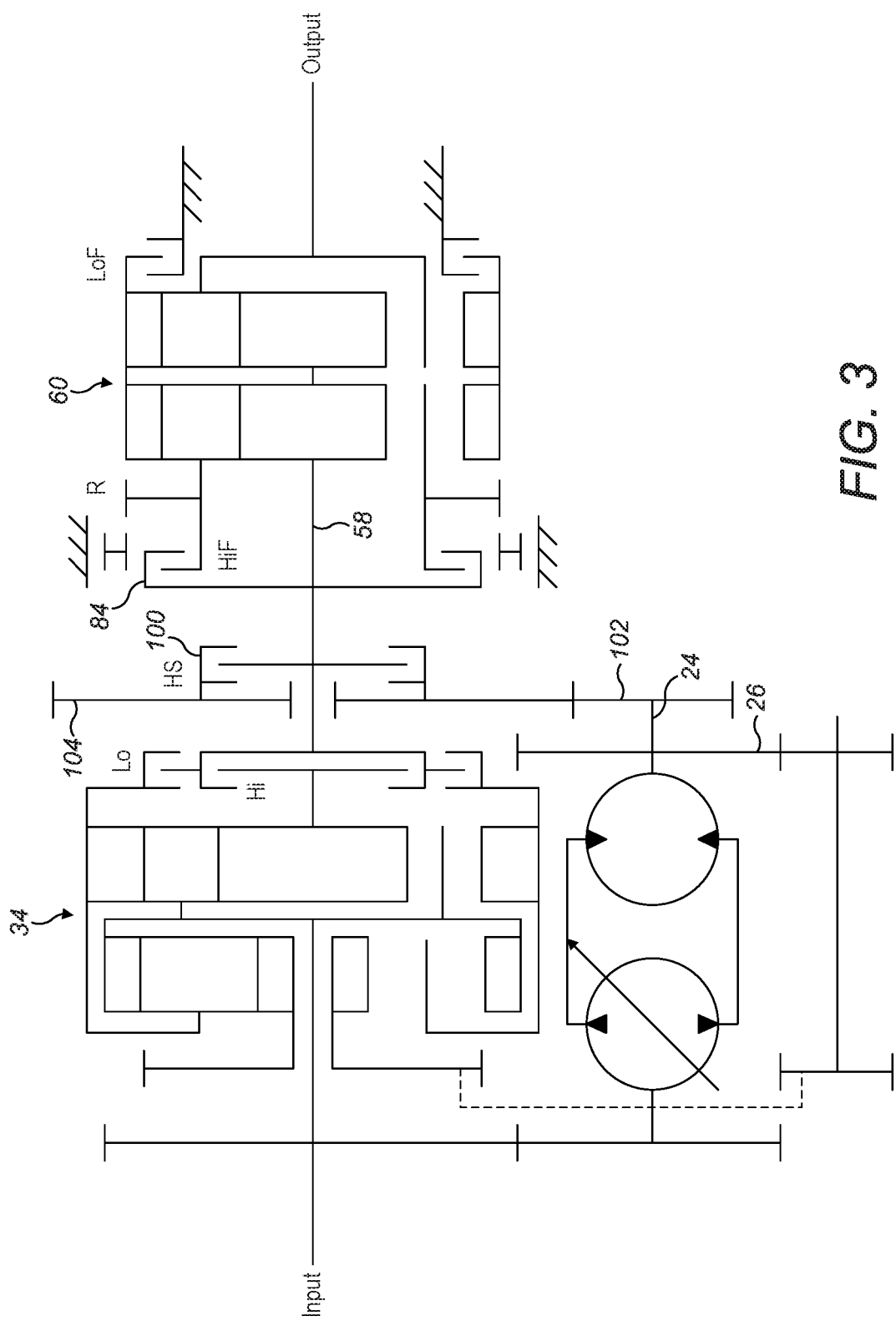
FIG. 3 is a schematic view of a third embodiment of a variator-assisted transmission.

FIG. 3 schematically illustrates a third embodiment of a VAT, which is another modified version of the VAT shown in FIG. 1. As can be seen, the modification is the introduction of an additional connecting component 100 between the summing and output transmissions 34,60. This variator connecting component 100 is preferably a clutch, which will be referred to as the variator clutch for ease of reference. The variator clutch 100 has an input side connected to the variator output gear 26 by a first intermediate gear 102 which is co-axial with the output gear 26 and is connected to the same variator output shaft 24. A second intermediate gear 104 meshes with the first intermediate gear 102. It is this second intermediate gear 104 which is connected to the input side of the variator clutch 100. The output side of the variator clutch 100 is connected to the second intermediate shaft 58. In this embodiment, the variator motor 18 can therefore be connected to the output transmission 60 and output shaft 4 directly via the variator clutch 100 and bypass the summing transmission 34 when the first low and high speed clutches 52,56 are both disengaged.

Figure 4:
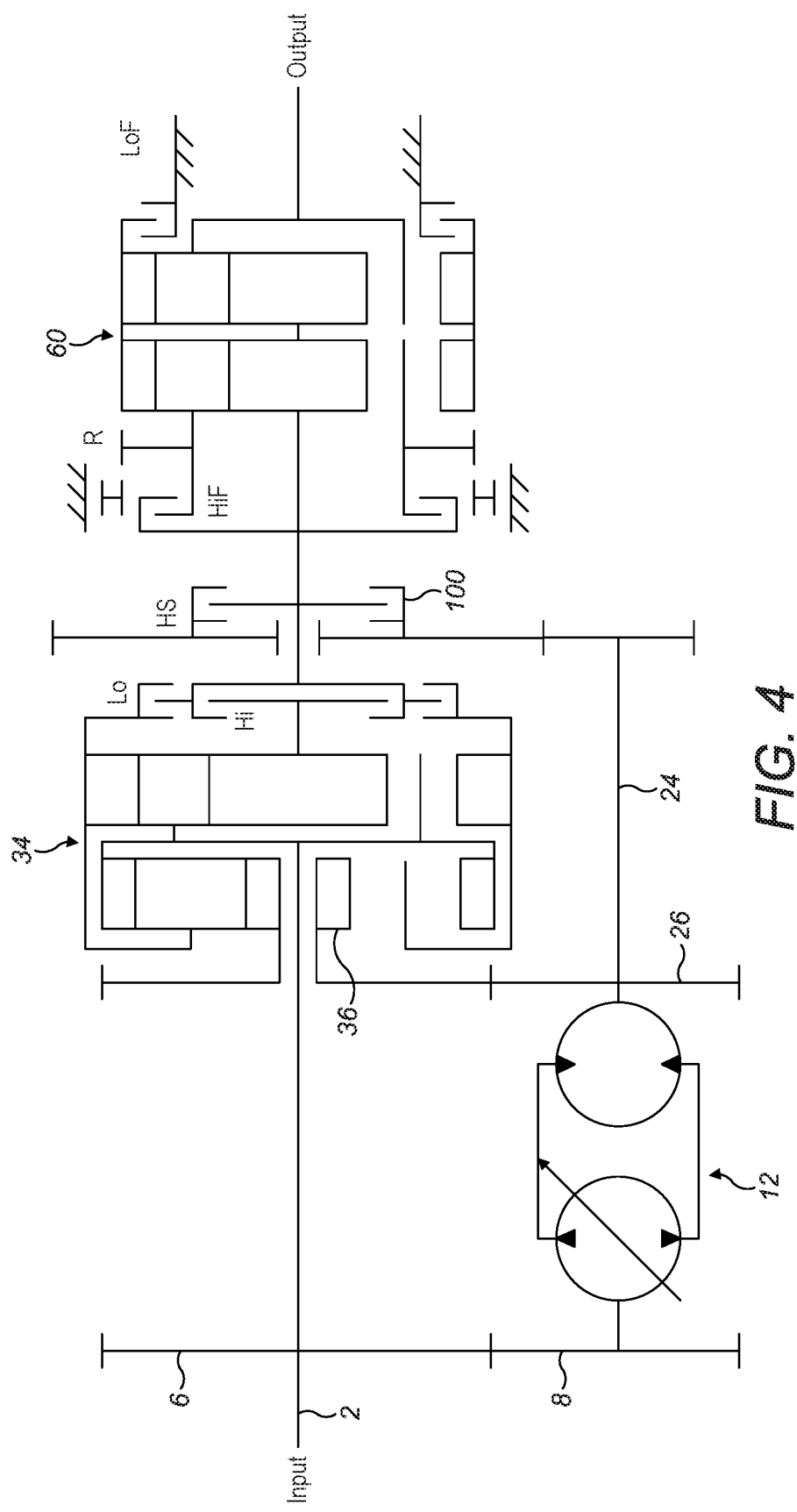
FIG. 4 is a schematic view of a fourth embodiment of a variator-assisted transmission.

FIG. 4 schematically illustrates a fourth embodiment of a VAT, which is a further modification of the third embodiment shown in FIG. 3 and relates to the re-positioning of the variator 12 in the same manner as shown in FIG. 2. As in the second embodiment, in this fourth embodiment, the position of the variator is moved so that is in line with the summing and output transmissions 34,60. This modification involves moving the input and satellite gears 6,8 along the input shaft 2 so that they are closer to the engine (not shown). This frees up space and allows the variator 12 to be moved up into the vacated space in line with the remainder of the transmission. Consequently, the layshaft can be removed with the variator output shaft 24 directly connected to the first sun gear 36 via the variator output gear 26. The variator output shaft 24 also remains connected to the input side of the variator clutch 100 using the same arrangement as in the third embodiment.

Figure 5:
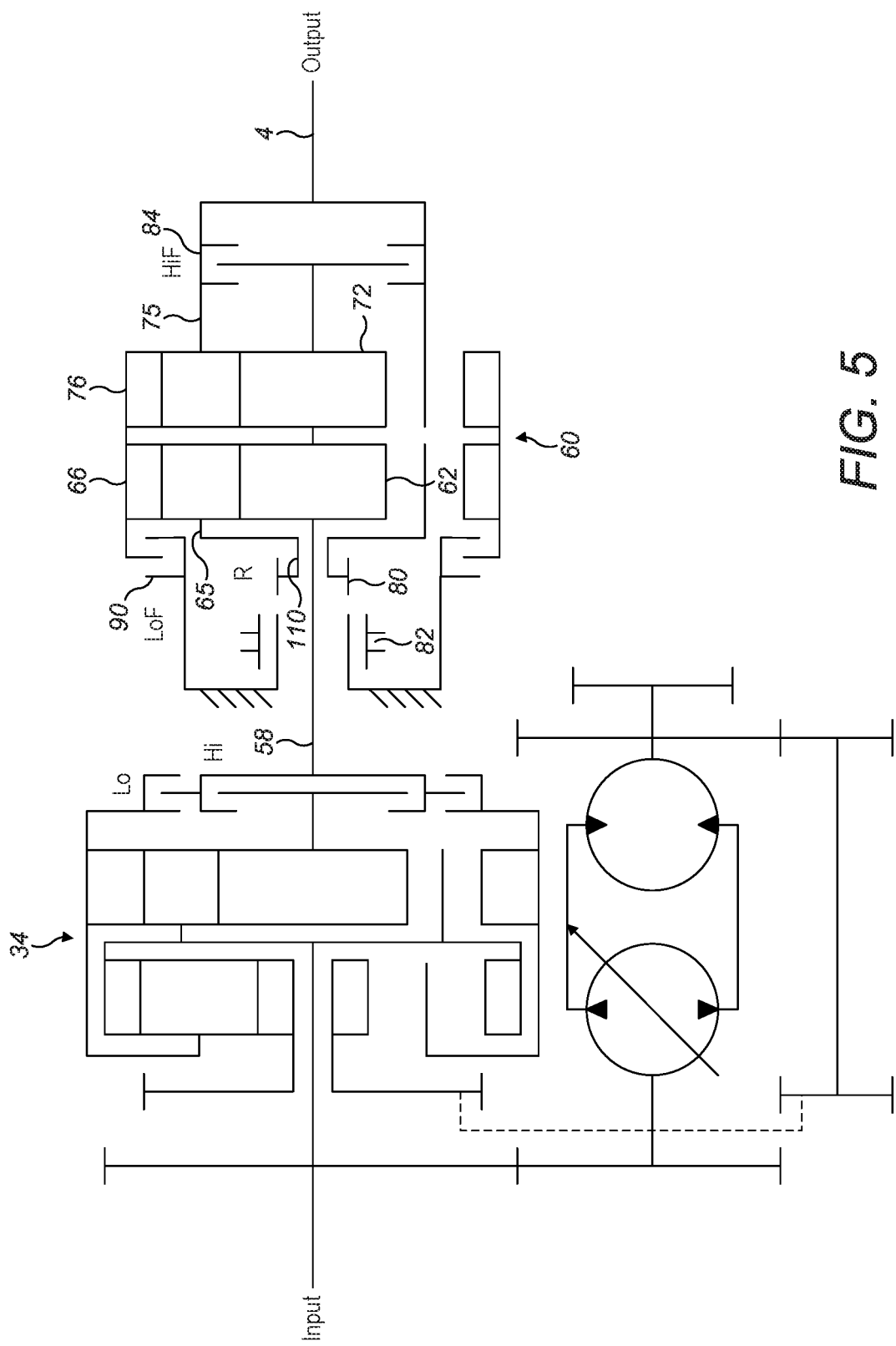
FIG. 5 is a schematic view of a fifth embodiment of a variator-assisted transmission.

FIG. 5 schematically illustrates a fifth embodiment of a VAT, which is another modified version of the VAT shown in FIG. 1. In this embodiment, the second high and low speed clutches 84,90 and the reverse member 80 have been repositioned around the output transmission 60 with the aim of providing an even more compact transmission in both the axial and radial directions.

As in the first embodiment, the second intermediate shaft 58 is connected to the third and fourth sun gears 62,72 and the input side of the second high speed clutch 84. However, the second high speed clutch 84 is now located on the output side of the output transmission 60 rather than between the summing and output transmissions 34,60. The output side of the second high speed clutch 84 is now connected to the fourth planet carrier 75, which as before is itself connected to the output shaft 4. As in the first embodiment, the third and fourth ring gears 66,76 are connected to one another and also the second low speed clutch 90. However, the second low speed clutch is now located between the summing and output transmissions 34,60. As before the reverse member 80 is connected to the third planet carrier 65. However, the reverse member 80 and its sliding collar 82 are now located radially inward of the second low speed clutch 90, with the third planet carrier 65 and reverse member connected to one another by a tube shaft 110 which is co-axial with the second intermediate shaft 58.

Figure 6:
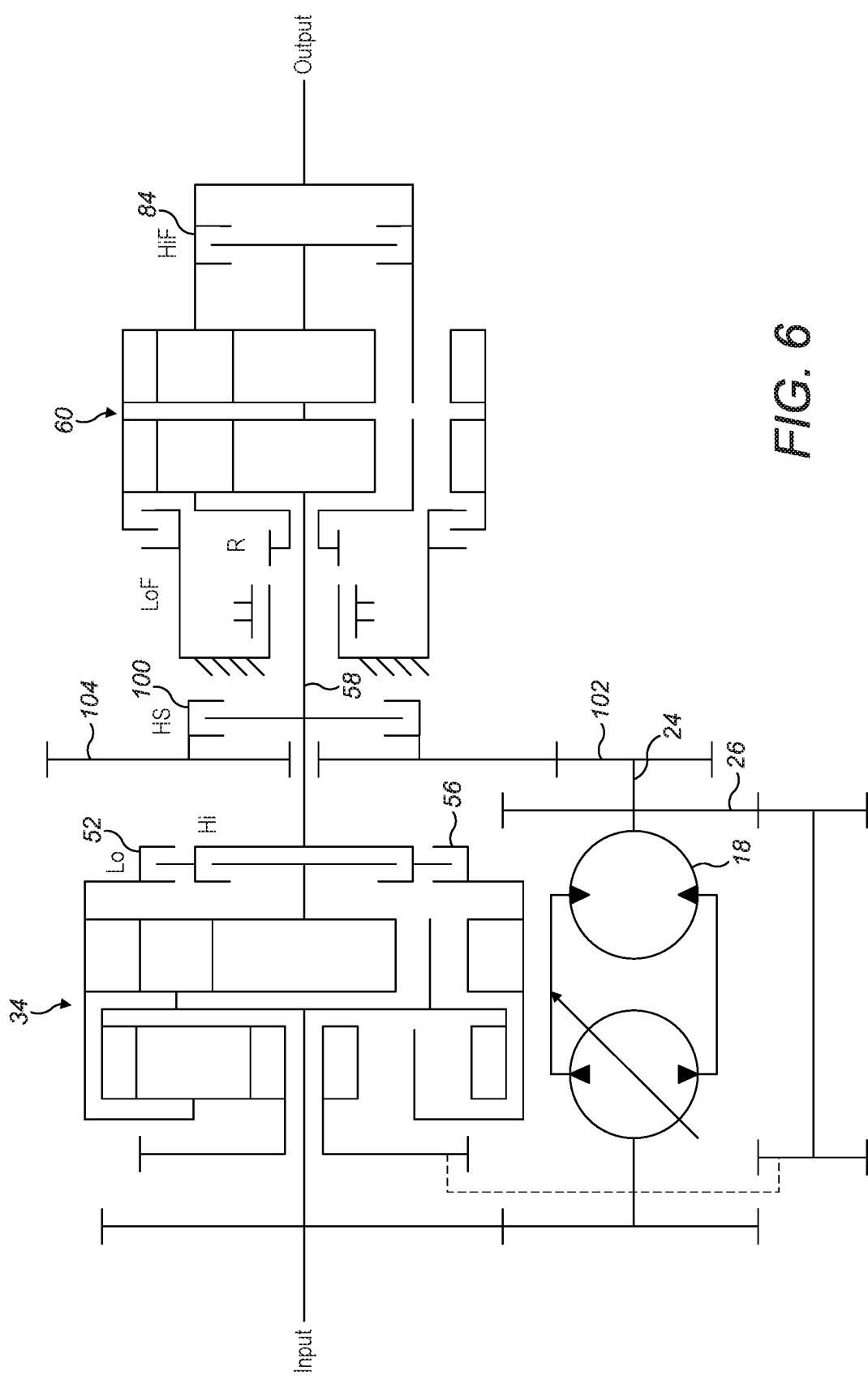
FIG. 6 is a schematic view of a sixth embodiment of a variator-assisted transmission.

FIG. 6 schematically illustrates a sixth embodiment of the VAT, which is a modification of that shown in FIG. 5. As can be seen, the modification is the introduction of the variator clutch 100 between the summing and output transmissions 34,60, in a similar manner to that of the third embodiment shown in FIG. 3. As in that third embodiment, the clutch 100 has an input side connected to the variator output gear 26. The variator clutch 100 is connected to the output gear 26 by a first intermediate gear 102 which is co-axial with the output gear 26 and is connected to the same variator output shaft 24, and a second intermediate gear 104 which meshes with the first intermediate gear 102. It is this second intermediate gear 104 which is connected to the input side of the variator clutch 100. The output side of the variator clutch 100 is connected to the second intermediate shaft 58. As in the third embodiment, the variator motor 18 can therefore be connected to the output transmission 60 and the output shaft 4 directly via the variator clutch 100 and bypass the summing transmission 34 when the first low and high speed clutches 52,56 are both disengaged.

Figure 7:
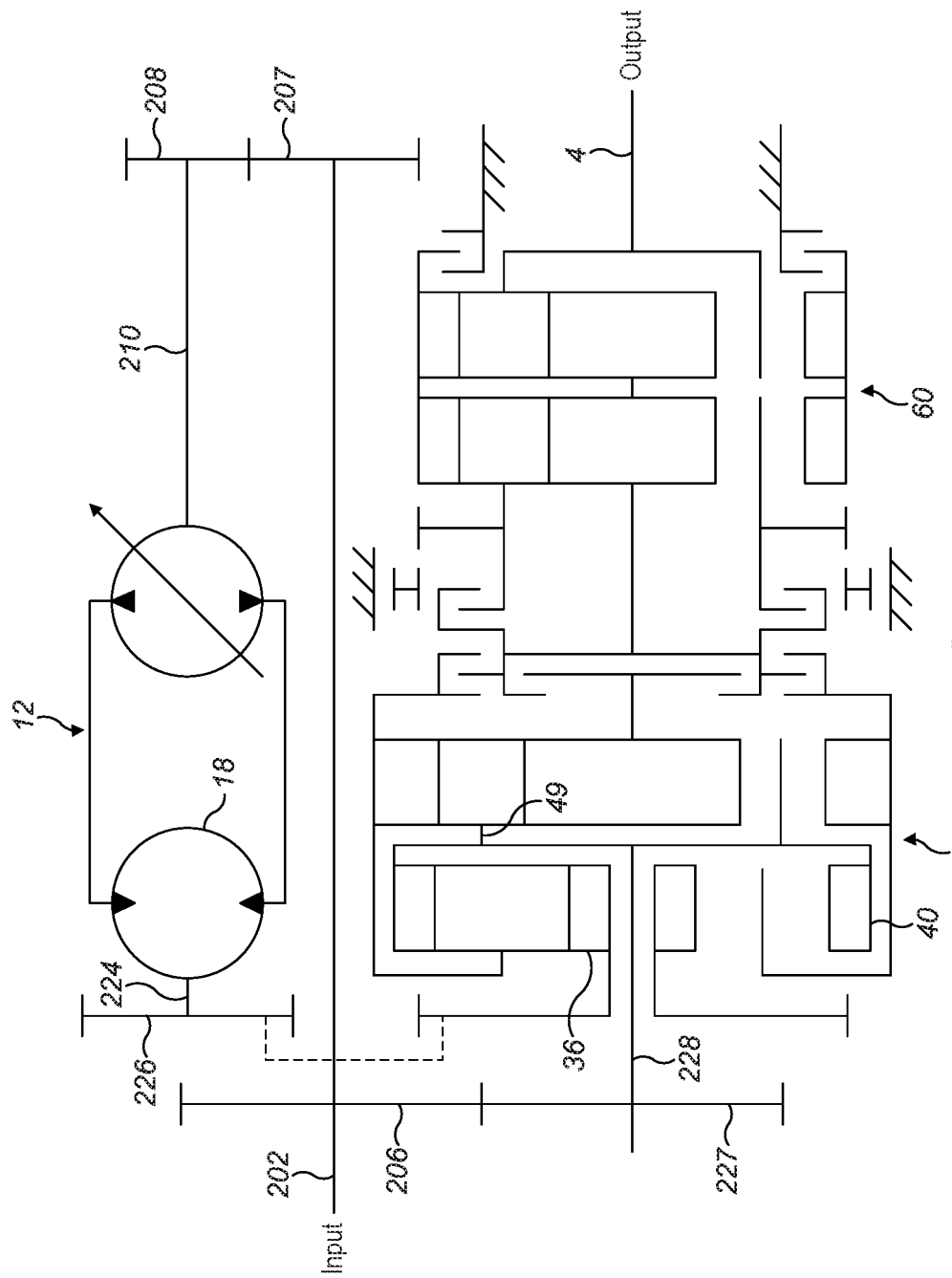
FIG. 7 is a schematic view of a seventh embodiment of a variator-assisted transmission.

FIG. 7 schematically illustrates a seventh embodiment of a VAT, which is a further modification to the first embodiment shown in FIG. 1. In this modified embodiment, the transmission employs an offset input shaft 202 packaged above the summing and output transmissions 34,60 so as to make the transmission even more compact in the axial direction. The input shaft 202 is connected to an engine (not shown) and has a first input gear 206 proximal to the engine. A second input gear 207 is located at a distal end of the input shaft 202 remote from the engine. A satellite gear 208 is meshed with the second input gear 207 and is carried on a variator input shaft 210 which lies in parallel to the input shaft 202. The input shaft 210 drives a hydrostatic variator 12 having the same arrangement as that shown in FIG. 1. The motor 18 of the variator 12 is connected to a variator output shaft 224 which carries a variator output gear 226. The variator output gear 226 meshes with the first sun gear 36 of the summing transmission 34.

The first input gear 206 is meshed with a drive gear 227 which is non-rotatably supported upon a drive shaft 228. The drive shaft 228 is co-axial with an output shaft 4 and parallel to the input shaft 202. The drive shaft 228 is connected to the first ring gear 40 and second planet carrier 49 of the summing transmission 34 in the same manner as the input shaft 2 in the first embodiment. The remainder of the summing and output transmissions 34,60, the various clutches and reverse member are identical to those described in connection with FIG. 1.

Figure 8:
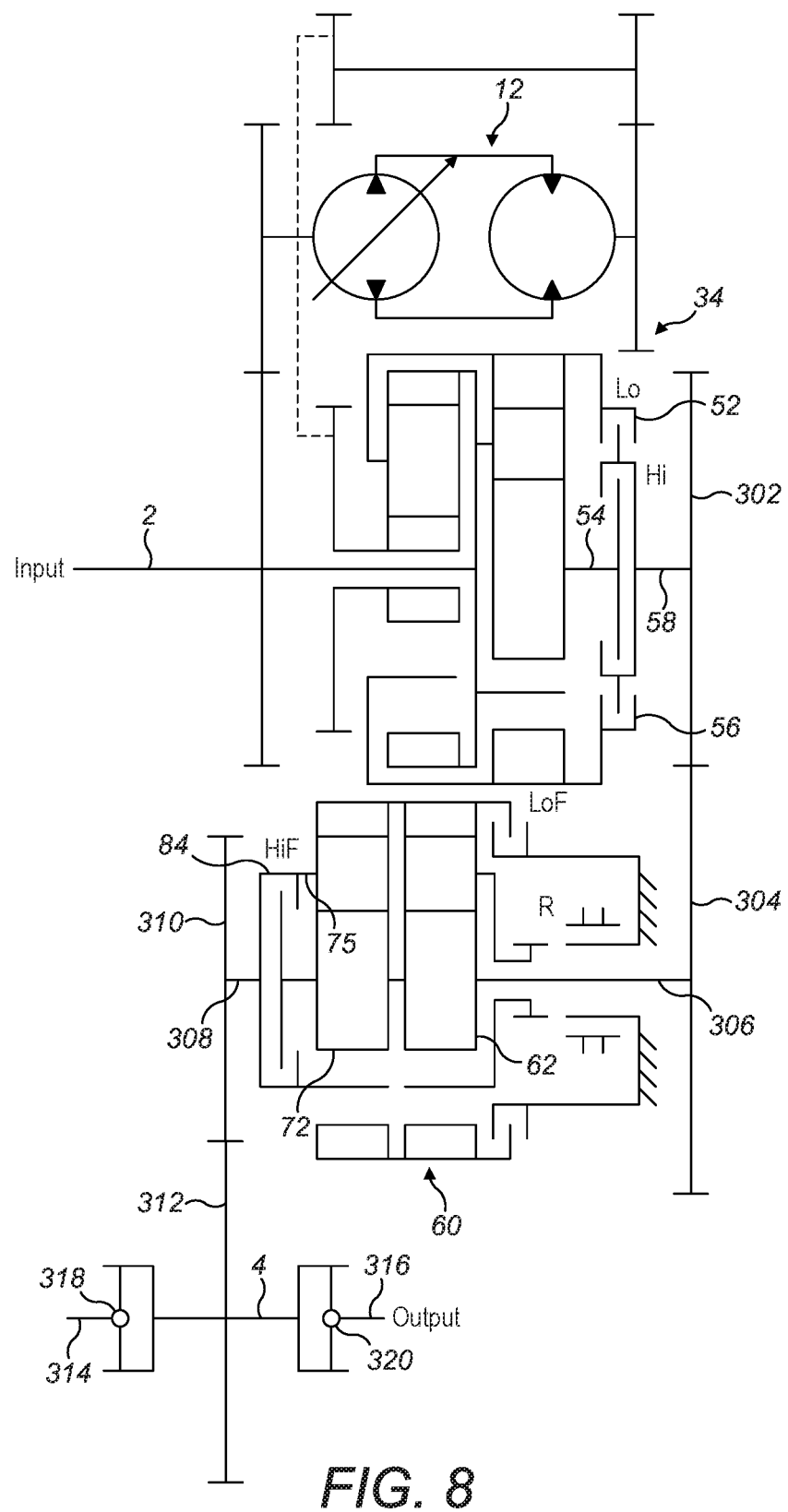
FIG. 8 is a schematic view of a eighth embodiment of a variator-assisted transmission.

FIG. 8 shows an eighth embodiment of a VAT, which is a modified version of the transmission shown in the fifth embodiment shown in FIG. 5. In this eighth embodiment, the VAT has been modified so as to be as compact as possible in the axial direction. This is achieved in this embodiment by packaging the variator, summing transmission, output transmission and output shaft in parallel with one another. The arrangement of the input shaft 2, summing transmission 34 and variator 12 is essentially the same as that shown in FIG. 5 (as well as FIGS. 1 and 3) and will not be described further here. In this modified embodiment, the second intermediate shaft 58 is considerably shorter than in the preceding embodiments and has a first intermediate gear 302 attached to its remote end, that is the end remote from the summing transmission 34 and first low and high speed clutches 52,56. A second intermediate gear 304 is meshed with the first intermediate gear 302 and is connected to a third intermediate shaft 306. The third intermediate shaft 306 runs parallel to the input shaft 2 and first and second intermediate shafts 54,58 in the direction back towards the engine (not shown). The output transmission 60 lies upon the third intermediate shaft 306, with the shaft 306 connected to the third and fourth sun gears 62,72 and the input side of the second high speed clutch 84 in the same manner as the second intermediate shaft in FIG. 5.

The fourth planet carrier 75 and the output side of the second high speed clutch 84 are connected to a fourth intermediate shaft 308. Fixed to the end of the fourth intermediate shaft 308 is a third intermediate gear 310. The third intermediate gear 310 is meshed with an output gear 312 which is connected to the output shaft 4 which lies in parallel with the input shaft 2 and various intermediate shafts 54,58,306. In the illustrated embodiment drive is directed to the front and rear of a vehicle (not shown) via front and rear drive shafts 314,316 to which the output shaft 4 is connected via a pair of universal joints 318,320.

Figure 9:
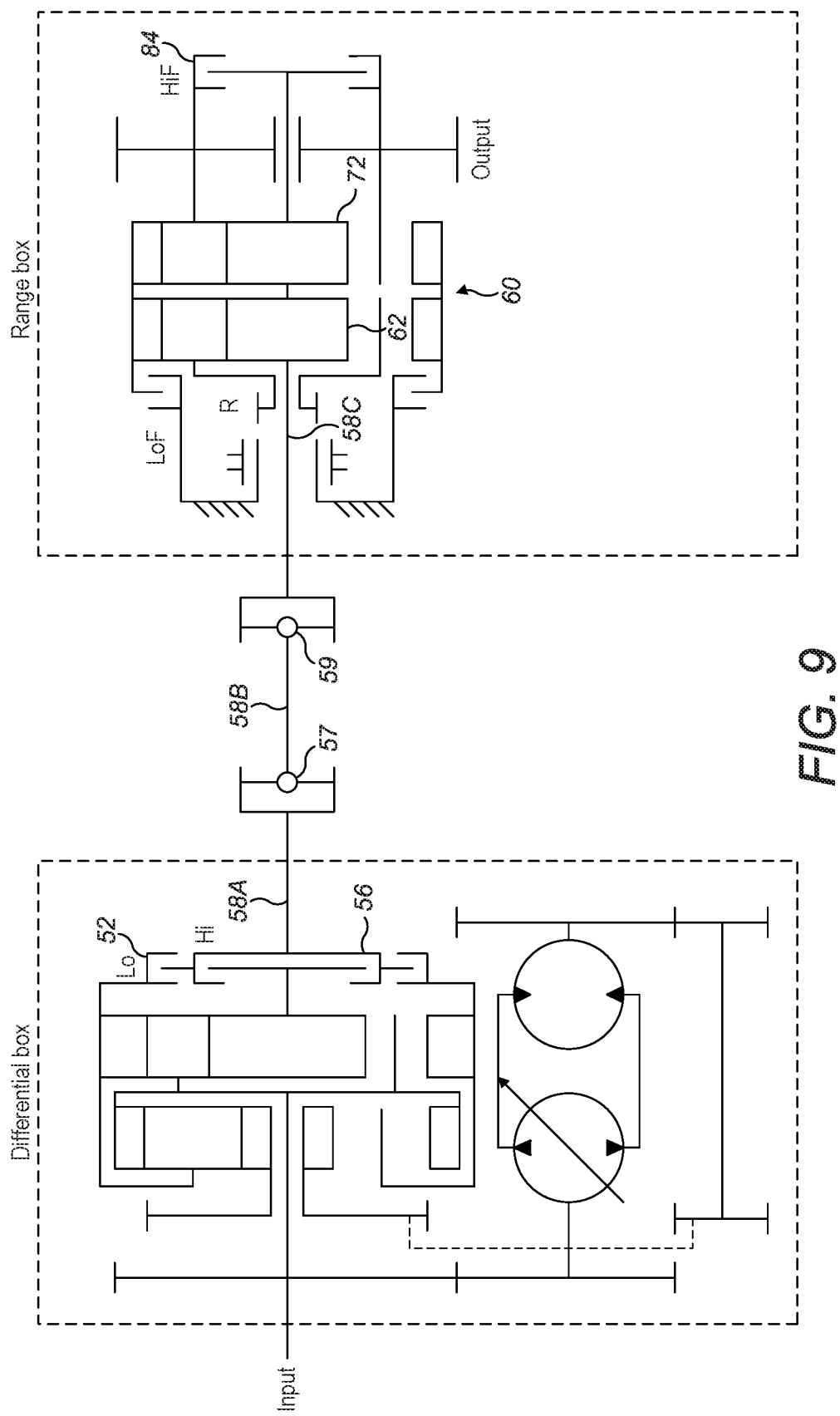
FIG. 9 is a schematic view of a ninth embodiment of a variator-assisted transmission.

FIG. 9 schematically illustrates a ninth embodiment of a VAT, in which the VAT is packaged in an articulated off-highway truck such as a Caterpillar 725C, for example. The ninth embodiment is a modified version of the fifth embodiment shown in FIG. 5. As this embodiment is to be employed in an articulated truck the second intermediate shaft 58 is divided into three co-axial portions 58A-58C. A first shaft portion 58A connects the output side of the first low and high speed clutches 52,56 with a first end of a second shaft portion 58B via a first universal coupling 57. A second end of the second shaft portion 58B is connected with a third shaft portion 58C via a second universal coupling 59. The third and fourth sun gears 62,72 of the output transmission 60 are located upon the third shaft portion 58C, as is the input side of the second high speed clutch 84.

The output side of the second high speed clutch 84 is connected to the fourth planet carrier 75 as in the fifth embodiment. However, the ninth embodiment is further modified by replacing the output shaft on the output side of the second high speed clutch 84 with an output gear 404. In the articulated truck, the output gear 404 is connected to a lockable differential (not shown) which provides drive to the front and rear wheels of the truck.

Figure 10:
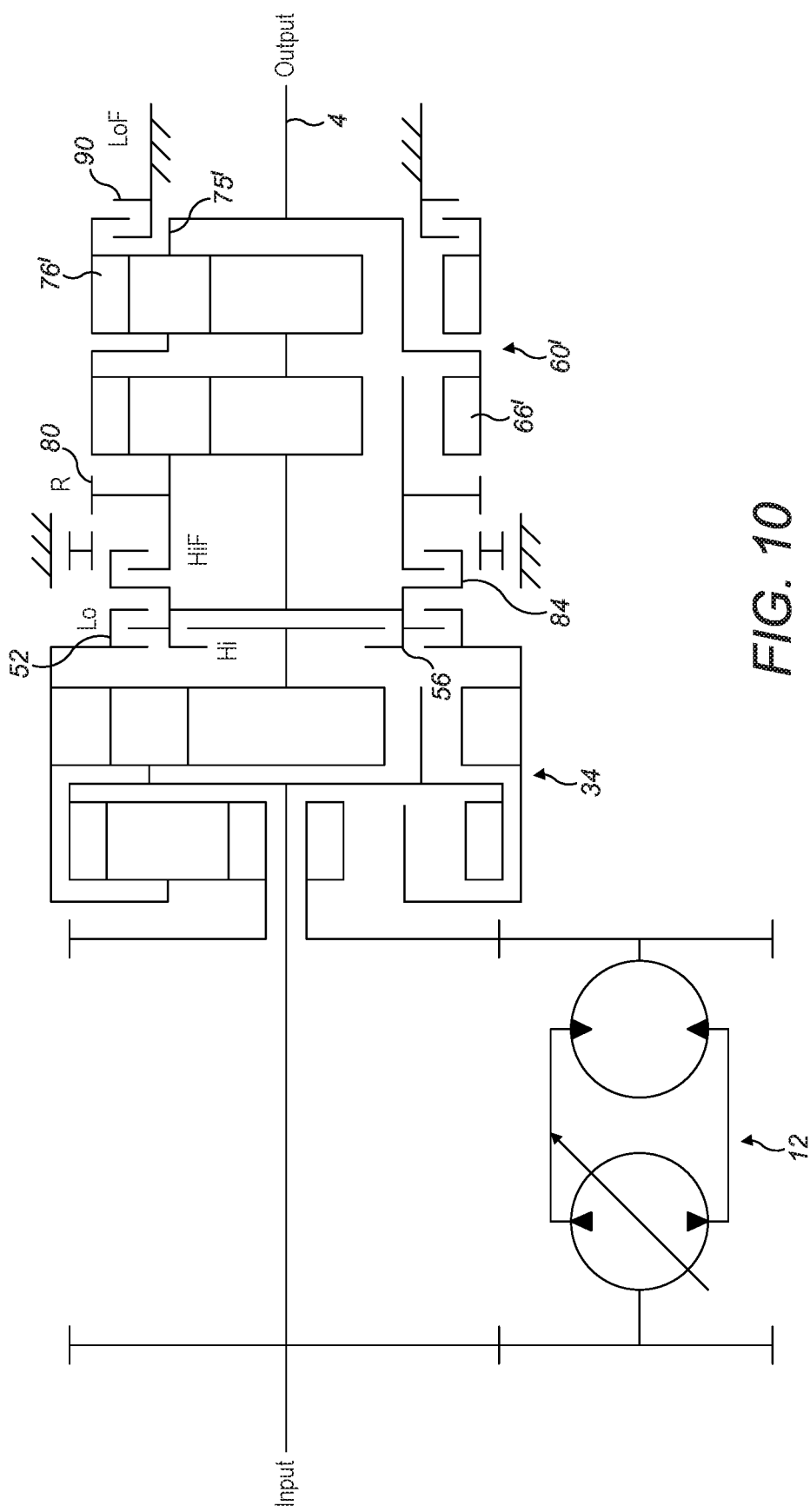
FIG. 10 is a schematic view of a tenth embodiment of a variator-assisted transmission.

A tenth embodiment of a VAT is schematically illustrated in FIG. 10. This tenth embodiment is a modified version of the second embodiment shown in FIG. 2. The arrangement of the variator 12, summing transmission 34, the various clutches 52,56,84,90 and reverse member 80 in this tenth embodiment is identical to that of the second embodiment. However, in this embodiment the arrangement of the gears within the output transmission 60' has been modified. Here, instead of being connected to the fourth ring gear 76' the third ring gear 66' is connected to the fourth planet carrier 75' and the output shaft 4. The fourth ring gear 76' alone is connected to the second low speed clutch 90.

INDUSTRIAL APPLICABILITY

As will be explained below, each of the embodiments of the variator-assisted transmission shown in FIGS. 1-10 provides a continuously variable transmission which has four forward modes and two reverse modes. The third, fourth and sixth embodiments also have an additional zero speed and inching mode courtesy of the variator clutch arrangement, as will also be explained in more detail below.

As regards the various forward and reverse transmission modes each of the illustrated embodiments is operated in substantially the same manner, including those embodiments which employ a variator clutch. Therefore only a detailed description of the operation of the first embodiment shown in FIG. 1 will be provided. However, it should be understood that this method of operation can be applied to any of the other embodiments described herein. Whilst the method of operation of the transmission is the same across all of the embodiments, the manner in which power is provided to the output when the second high speed clutch is engaged depends upon whether the embodiment in question comprises a transmission in which the second high speed clutch is located between the summing and output transmissions (as in the embodiments shown in FIGS. 1-4 and 7), whether the second high speed clutch is on the output side of the output transmission 60 (as in the embodiments shown in FIGS. 5, 6, 8 and 9), or indeed how the gears of the output transmission are connected with one another (FIG. 10).

Figure 11:
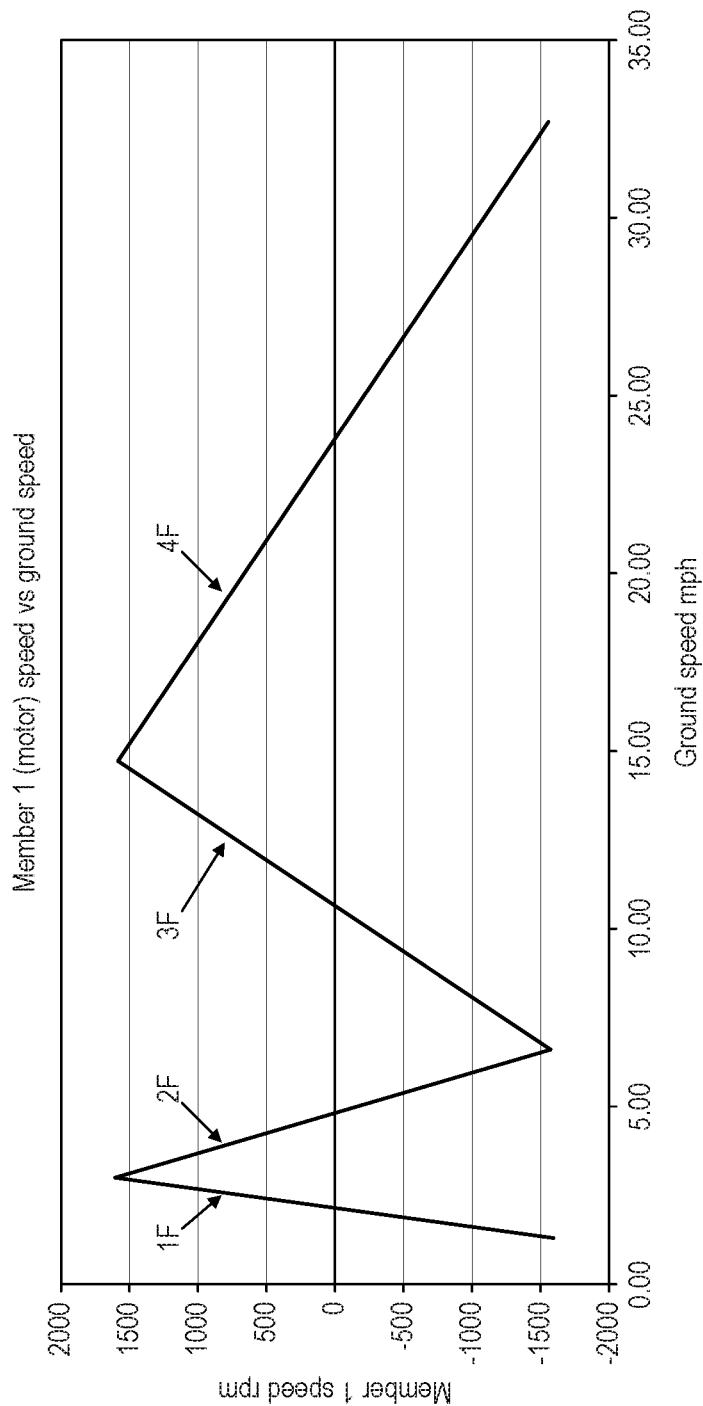
FIG. 11 is a graph illustrating variator speed versus ground speed in a vehicle incorporating a variator-assisted transmission as shown in any of FIGS. 1 to 10.

FIG. 11 illustrates how the speed of the variator motor 18 is varied across the four forward transmission modes, designated 1F-4F, and how those variations relate to ground speed of a vehicle in which the transmission is utilised. It should of course be recognised that the actual ground speed of the vehicle will depend on a number of factors, not least the specific ratios of the planetary gears used in the summing and output transmissions and the input speed at the transmission input shaft from the engine. The specific values given in this graph and this description should therefore be taken as examples only and in no way limiting to the scope of the present invention.

Referring to FIGS. 1 and 11, when the first forward transmission mode 1F is to be engaged the swash plate 16 of the variator pump 14 is adjusted to its maximum negative displacement so that the variator motor 18 is producing its maximum negative speed. The transmission input speed from the engine in this example is about 1600 rpm, and so in this state the first sun gear 36 connected to the variator motor 18 is rotating at about −1600 rpm. The first and second low speed clutches 52,90 are both engaged. Power is therefore provided from the input shaft 2 to the output transmission 60 via the first ring gear 40, the first planet carrier 39 and second ring gear 50 of the summing transmission 34, and the first low speed clutch 52. From the first low speed clutch 52 power is provided to the output shaft 4 via the second intermediate shaft 58, the fourth sun gear 72 and fourth planet carrier 75 of the output transmission 60.

With the engine input speed substantially constant, acceleration of the vehicle through the first transmission mode 1F is achieved by control of the variator 12. As can be seen in FIG. 11, as the variator's negative displacement and associated speed is reduced towards zero and beyond to a positive displacement and associated speed the ground speed of the vehicle increases. This speed variation is based upon the rotational direction and speed of the first sun gear 36 as dictated by the variator 12. As the first ring gear 40 is directly connected to the input shaft 2 the maximum speed of the first ring gear 40 is about 1600 rpm, which is the same for the first sun gear 36 when the variator is at its maximum positive displacement and speed.

To increase vehicle speed further, the transmission must be shifted from the first forward mode 1F to the second forward mode 2F. This involves disengaging the first low speed clutch 52 and engaging the first high speed clutch 56 whilst the second low speed clutch 90 remains engaged and braking the ring gears 66,76 in the output transmission 60. With these changes implemented, power is provided to the first high speed clutch 56 from the input shaft 2 via the second planet carrier 49, the second sun gear 46 and the first intermediate shaft 54. From the first high speed clutch 56 power is still provided to the output shaft 4 via the second intermediate shaft 58, the fourth sun gear 72 and fourth planet carrier 75.

Again, acceleration of the vehicle in the second forward mode 2F is achieved by control of the variator 12. Referring again to FIG. 11, as the variator's positive displacement and associated speed is reduced back towards zero and beyond to a negative displacement and associated speed the ground speed of the vehicle increases further due to the variation in rotational speed and direction of the first sun gear 36 compared with the second sun gear 46.

Further increases in vehicle speed are achieved by entering the third and fourth forward modes 3F and 4F. To enter the third mode 3F from the second mode 2F the first high speed clutch 56 and second low speed clutch 90 are disengaged, and the first low speed clutch 52 and second high speed clutch 84 are engaged. Consequently, power is provided to the first low speed clutch 52 from the input shaft 2 via the first ring gear 40, the first planet carrier 39 and the second ring gear 50. With the second high speed clutch 84 engaged in the embodiments shown in FIGS. 1-4 and 7, the second intermediate shaft 58, its associated sun gears 62,72 and the third planet carrier 65 rotate as one. This results in a step change reduction in the rotational speed of the second intermediate shaft 58 in the third mode 3F compared to the second mode 2F. With the second low speed clutch 90 now disengaged, the third and fourth ring gears 66,76 can rotate relative to the remaining components of the output transmission 60, with the result that power is provided to the output shaft 4 via the fourth planet carrier 75.

In the embodiments shown in FIGS. 5, 6, 8 and 9 when the second high speed clutch 84 is engaged the intermediate shaft 58, the sun gears 62,72 and the fourth planet carrier 75 rotate as one in order to provide power to the output shaft 4. In the embodiment of FIG. 10, when the second high speed clutch 84 is engaged the third sun gear 62 and third planet carrier 65 rotate as one and power is provided to the output shaft 4 via the third ring gear 66' and the fourth planet carrier 75'

Again, as seen in FIG. 11, ground speed is increased in the third forward mode 3F as the variator's displacement is once again increased from its maximum negative displacement and rotational speed of −1600 rpm through zero speed until the first sun gear is once again rotating at its maximum speed of 1600 rpm.

The fourth forward mode 4F is entered from the third mode 3F by disengaging the first low speed clutch 52 and engaging the first high speed clutch 56 whilst the second high speed clutch 84 remains engaged. Thus, power is provided from the input shaft 2 to the first high speed clutch 56 via the second planet carrier 49, the second sun gear 46 and the first intermediate shaft 54. When the second high speed clutch 84 is engaged power is provided to the output shaft 4 in the same manner as described above in respect of the third mode 3F and the groups of embodiments shown in FIGS. 1-4 and 7, FIGS. 5, 6, 8 and 9 and FIG. 10.

Again, acceleration of the vehicle through the fourth forward mode 4F is achieved by control of the variator 12. Referring again to FIG. 11, as the variator's positive displacement and associated speed from the previous mode 3F is reduced towards zero and beyond to a negative displacement and associated speed, the ground speed of the vehicle increases further due to the variation in rotational speed and direction of the first sun gear 36 compared with the second sun gear 46.

The transmissions of the foregoing embodiments also have two reverse transmission modes 1R and 2R. In order to engage the initial reverse transmission mode 1R, all of the clutches within the transmission are disengaged except for the first low speed clutch 52. At the same time the sliding collar 82 is brought into contact with the reverse member 80, with the result that the reverse member and third planet carrier 65 are held against rotation by the collar 82. Power is therefore provided to the first low speed clutch 52 from the input shaft 2 via the first ring gear 40, the first planet carrier 39 and the second ring gear 50.

The second intermediate shaft 58 and its associated sun gears 62,72 rotate in a first direction due to the engagement of the first low speed clutch 52. Due to the third planet carrier 65 being held against rotation the third and fourth ring gears 66,76 rotate in the opposite direction to that of the sun gears 62,72. This means that the fourth planet carrier 75 and the output shaft 4 are also rotating in the opposite direction so that the vehicle moves in the reverse direction.

If greater ground speed is required whilst in reverse, the transmission can be moved from the first reverse mode 1R to the second reverse mode 2R. To do so, the first low speed clutch 52 is disengaged and the first high speed clutch 56 is engaged whilst the sliding collar 82 continues to engage and hold the reverse member 80 and third planet carrier 65 against rotation. In this mode, power is once again provided to the first high speed clutch 56 via the second planet carrier 49, the second sun gear 46 and the first intermediate shaft 54. Power is provided to the output shaft 4 via the output transmission in the same manner as described in respect of the first reverse mode 1R.

In either reverse mode 1R,2R, the ground speed of the vehicle can once again be adjusted by adjusting the rotational speed and direction of the first sun gear 36 via the variator 12 in the same manner as described for the four forward modes 1F-4F.

A number of the embodiments of the VAT described herein are also capable of producing a zero speed output and a crawling/inching function. These are the third, fourth and sixth embodiments shown in FIGS. 3, 4 and 6 which employ the hydrostatic variator clutch 100. As has already been described above, these embodiments allow the variator 12 to bypass the summing transmission 34 and connect directly to the output shaft 4 via the intermediate shaft 58, sun gears 62,72 and the fourth planet carrier 75. To facilitate this function the first low and high speed clutches 52,56 are disengaged along with the second high speed clutch 84. The second low speed clutch 90 and variator clutch 100 are engaged. Thus, power is provided to the output shaft 4 directly from the variator motor 18 via the first and second intermediate gears 102,104, the variator clutch 100, the intermediate shaft 58, the fourth sun gear 72 and the fourth planet carrier 75. By adjusting the swash plate 16 of the variable displacement pump 14, the variator motor 18 can control the rotational speed of the intermediate shaft 58 and hence the rotational speed of the output shaft 4. Thus, a vehicle employing such a VAT can sit at rest without any creep or else can inch or crawl at very low speed under the control of the variator 12. In the embodiments shown in FIGS. 3 and 6 where a layshaft is present between the variator output gear 26 and the first sun gear 36, switching the transmission from the zero speed or crawling mode into the first forward mode 1F involves simply disengaging the variator clutch 100 and engaging the first low speed clutch 52. However, in the embodiment disclosed in FIG. 4 where no layshaft is present, switching from the crawling mode into the first forward mode 1F involves disengaging the variator clutch 100, immediately reversing the rotational direction of the variator motor 18 and variator output gear 26 via the swash plate 16 of the variator pump 14, and then engaging the first low speed clutch 52.

To launch a vehicle incorporating a transmission in accordance with the present invention, the first low speed clutch 52 (or indeed any of the other clutches present) is engaged and controllably slipped until such time as the clutch input and output elements are rotating at speeds within a predetermined range of one another. The clutch can then be fully engaged for the transmission to enter either the first forward or first reverse modes 1F,1R.

The positioning of the majority of the connecting components, and at least the first and second connecting components, in a connecting space between the differential and range transmissions allows the variator-assisted transmission of the present invention to be more compact than known transmissions of this type. Being more compact means that the transmission can be lighter and less expensive than those known transmissions, with the result that they can be utilised in comparatively small-scale applications such as for on-highway trucks and buses rather than only in large-scale applications such as track-type tractors and the like.

In the embodiments including the optional variator connecting component, the present invention also provides a direct connection between the variator and output shaft via the range transmission. Those embodiments therefore have zero speed and inching/crawling modes, which are controlled by the variator and can be implemented in vehicles in which such modes are desirable.

Although the variator used in each of the preferred embodiments is a hydrostatic variator, the present invention is not limited to the use of such a variator. For example, the VAT of the present invention may alternatively use an electrical or mechanical variator.

The preferred embodiments of the transmission include output transmissions in which the fourth ring gear is connected to the third ring gear, or the third ring gear is connected to the fourth planet carrier. However, the output transmission may be adapted such that the fourth ring gear is connected to the third planet carrier instead.

Whilst the connecting components utilised in the preferred embodiments are all clutches one or more of the connecting components may instead be a sliding collar. Furthermore, where clutches are used they may be provided with synchroniser rings.

These and other modifications and improvements may be incorporated without departing from the scope of the invention.

The invention claimed is:

1. A continuously variable transmission comprising:
an input shaft drivable by an engine;
an output shaft connectable to a load;
a variator having an input side connected to the input shaft, and an output side, the variator being adjustable so as to vary a transmission ratio between the input and output sides;
a differential transmission having a first differential input element connected to the input shaft, a second differential input element connected to the output side of the variator, and first and second differential output elements, the differential transmission further having:
a first planetary gear set comprising a first sun gear, a first planet gear rotatably supported on a first planet carrier, and a first ring gear; and
a second planetary gear set comprising a second sun gear, a second planet gear rotatably supported on a second planet carrier, and a second ring gear;
wherein the first differential input element is connected to the second planet carrier and the first ring gear, the second differential input element is connected to the first sun gear, the first differential output element is connected to the first planet carrier and the second ring gear, and the second differential output element is connected to the second sun gear;
a range transmission having a first range input element, and at least one range output element connected to the output shaft;
a first connecting component which selectively connects the first differential output element to the first range input element;
a second connecting component which selectively connects the second differential output element to the first range input element, wherein the first and second connecting components are located in a connecting space defined between the differential and range transmissions; and
a variator connecting component which selectively connects the output side of the variator directly to the first range input element when the first and second connecting components are disengaged from the first range input element.

2. The transmission of claim 1, wherein the range transmission further comprises a second range input element, and the transmission further comprises a third connecting component which selectively connects either the first or second connecting component to the second range input element, wherein the third connecting component is located in the connecting space.

3. The transmission of claim 2, wherein the range transmission further comprises:
a third planetary gearset comprising a third sun gear, a third planet gear rotatably supported on a third planet carrier, and a third ring gear;
a fourth planetary gearset comprising a fourth sun gear, a fourth planet gear rotatably supported on a fourth planet carrier, and a fourth ring gear; and
a braking element which selectively holds at least the fourth ring gear against rotation;
and wherein the third and fourth sun gears are connected to the first range input element, the third planet carrier is connected to the second range input element, and the fourth planet carrier is connected to the at least one range output element.

4. The transmission of claim 3, wherein the third and fourth ring gears are connected to one another and selectively held against rotation by the braking element.

5. The transmission of claim 1, wherein the transmission further comprises a third connecting component which selectively connects the first range input element to the output shaft.

6. The transmission of claim 5, wherein the third connecting component is located on the opposite side of the range transmission from the connecting space.

7. The transmission of claim 5, wherein the range transmission further comprises:
a third planetary gearset comprising a third sun gear, a third planet gear rotatably supported on a third planet carrier, and a third ring gear;
a fourth planetary gearset comprising a fourth sun gear, a fourth planet gear rotatably supported on a fourth planet carrier, and a fourth ring gear; and
a braking element which selectively holds at least the fourth ring gear against rotation;
and wherein the third and fourth sun gears are connected to the first range input element, and the fourth planet carrier is connected to the at least one range output element.

8. The transmission of claim 7, wherein the third and fourth ring gears are connected to one another and selectively held against rotation by the braking element.

9. The transmission of claim 1, wherein the variator connecting component is located in the connecting space with the first and second connecting components.

10. The transmission of claim 1, wherein each of the connecting components is a clutch.

11. The transmission of claim 1, wherein the variator is located in parallel with the differential transmission.

12. The transmission of claim 1, wherein the variator is located in-line with the differential transmission.

13. The transmission of claim 1, wherein the differential and range transmissions are arranged in parallel with one another.

14. The transmission of claim 1, wherein the differential and range transmissions are co-axial with one another.

15. A vehicle comprising a continuously variable transmission in accordance with claim 1.

16. A method of operating a continuously variable transmission in accordance with claim 1, the method comprising the steps of:
operating one of the first and second connecting components so that the first or second differential output element connects to the first range input element; and
adjusting the variator so as to vary the transmission ratio between the input and output sides of the variator.

17. The method of claim 16, further comprising the step of operating a third connecting component so that the first or second connecting component connects with the second range input element.

18. The method of claim 16, further comprising the step of operating a braking element to hold at least a fourth ring gear against rotation.

19. The method of claim 16, further comprising the steps of:
disengaging the first and second connecting components;
operating a variator connecting component so as to connect the output side of the variator directly to the first range input element; and
adjusting the variator so as to vary the transmission ratio between the input and output sides of the variator.

* * * * *